United States Patent
Sishtla et al.

(10) Patent No.: US 9,221,548 B1
(45) Date of Patent: Dec. 29, 2015

(54) ENGINE SYSTEM AND METHOD USING A MODE FOR ICING CONDITIONS

(71) Applicants: Venkata A. Sishtla, Marion, IA (US); Kevin M. Kronfeld, Cedar Rapids, IA (US); Roy E. Robertson, Marion, IA (US)

(72) Inventors: Venkata A. Sishtla, Marion, IA (US); Kevin M. Kronfeld, Cedar Rapids, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/452,235

(22) Filed: Aug. 5, 2014

(51) Int. Cl.
*B60L 9/00* (2006.01)
*B64D 43/00* (2006.01)
*B64D 45/00* (2006.01)

(52) U.S. Cl.
CPC ............... *B64D 43/00* (2013.01); *B64D 45/00* (2013.01); *B64D 2045/0085* (2013.01)

(58) Field of Classification Search
CPC .................................. F02C 7/047; F02C 7/057
USPC ............................................................ 701/3
See application file for complete search history.

(56) References Cited

U.S. PATENT DOCUMENTS

2012/0029786 A1* 2/2012 Calandra et al. ............... 701/100
2013/0226452 A1* 8/2013 Watts ............................ 701/528

OTHER PUBLICATIONS

U.S. Appl. No. 13/246,769, filed Sep. 27, 2011, Rockwell Collins, Inc.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,239, filed Mar. 12, 2014, Rockwell Collins, Inc.
U.S. Appl. No. 14/206,651, filed Mar. 12, 2014, Rockwell Collins, Inc.
U.S. Appl. No. 14/207,034, filed Mar. 12, 2014, Rockwell Collins, Inc.

* cited by examiner

*Primary Examiner* — Michael D Lang
(74) *Attorney, Agent, or Firm* — Angel N. Gerdzhikov; Donna P. Suchy; Daniel M. Barbieri

(57) ABSTRACT

A hazard warning system can be utilized in an aircraft. The hazard warning system can include a processing system for determining an icing condition and causing an indication of the icing condition to be provided to an engine control, such as a full authority digital engine control (FADEC). The engine can be operated in a mode in response to the indication. The mode can be a lower efficiency mode.

20 Claims, 4 Drawing Sheets

ENGINE SYSTEM AND METHOD USING A MODE FOR ICING CONDITIONS

CROSS REFERENCE TO RELATED APPLICATIONS

The present application is related to U.S. patent application Ser. No. 14/086,844 filed on Nov. 21, 2013, U.S. application Ser. No. 13/919,406 filed on Jun. 17, 2013, U.S. application Ser. No. 13/841,893 filed Mar. 15, 2013, U.S. application Ser. No. 14/207,034 filed on Mar. 12, 2014 herewith invented by Koenigs, et al., U.S. application Ser. No. 13/246,769 filed Sep. 27, 2011, and U.S. application Ser. No. 14/206,239 filed Mar. 12, 2014 invented by Venkata Sishtla and U.S. application Ser. No. 14/206,651 filed on Mar. 12, 2014 invented by Dana, et al., all incorporated herein by reference in their entireties and assigned to the assignee of the present application.

BACKGROUND

The disclosure relates generally to operation or control of engines. More particularly, the disclosure relates to operation or control of engines during weather hazards, including but not limited to operation or control of aircraft engines during icing conditions.

Ice crystals in the atmosphere can pose threats to the operation of vehicles such as aircraft. In particular, aircraft engines operating in an environment containing ice crystals can be susceptible to damage. Engine performance rollback issues are believed to be related to ice crystal accretion, followed by aggregate detachment in solid form before continuing through the aircraft engine. High efficiency engines are believed to be more susceptible to damage caused by ice crystals.

Engine damage can be caused by mixed phase and glaciated ice crystals which can be present near areas of deep convection and at higher altitudes. For example, ice particles entering engines often bounce off surfaces that are colder than freezing. When these ice crystals reach surfaces warmer than freezing in the core of the engine, small ice particles can melt and cause a film of water on the surface to which additional ice crystals can stick. This process gradually reduces the temperature of the surface which can result in accumulation of ice crystals. This accumulation of ice crystals can result in engine performance rollback and can even cause total engine failure.

Thus, there is a need for a system and/or method that senses an inferred or non-inferred icing condition, including but not limited to a high altitude ice crystal (HAIC) or high altitude ice crystal cloud (HAIC2) condition, and adjusts the engine for operation in such conditions. There is also a need for a hazard detection system that provides a signal related to actual or potential ice crystal presence to an engine or engine control system. Still further, there is a need for an icing condition mode for a high efficiency engine.

It would be desirable to provide a system and/or method that provides one or more of these or other advantageous features. Other features and advantages will be made apparent from the present disclosure. The teachings disclosed extend to those embodiments which fall within the scope of the appended claims, regardless of whether they accomplish one or more of the aforementioned needs.

SUMMARY

An exemplary embodiment relates to an aircraft. The aircraft includes a processing system for determining an icing condition and providing an indication of the icing condition to be sent to an engine control.

Another exemplary embodiment relates to an aircraft weather system. The aircraft weather system includes an icing condition module for determining a presence of an icing condition. The aircraft weather system also includes a communication circuit for providing an indication associated with the icing condition to an engine control.

Another exemplary embodiment relates to a method of controlling an engine using an electronic processor. The method including receiving data associated with a detected icing condition and operating the engine in a mode in response to the data.

An exemplary embodiment relates to an aircraft hazard warning system. The aircraft hazard warning system includes a processing system for detecting a high altitude ice crystal (HAIC) or HAIC clouds ($HAIC^2$) condition and providing a signal to an engine control indicating detection of the high altitude ice crystal (HAIC) or HAIC clouds (HAIC2) condition.

Another exemplary embodiment relates to a method of using a high altitude ice crystal (HAIC) or HAIC clouds ($HAIC^2$) warning on an aircraft using an electronic processor. The method includes receiving reflectivity data, processing the radar reflectivity data to determine the HAIC or $HAIC^2$ warning, and controlling the engine in response to the high altitude ice crystal (HAIC) or HAIC clouds ($HAIC^2$) condition.

Exemplary embodiments can utilize inferred and non-inferred techniques to determine presence of icing conditions including but not limited to HAIC or $HAIC^2$ conditions. Non-inferred techniques can utilize coherent and non-coherent integration to achieve detection at longer ranges according to certain embodiments. Inferred detection techniques can utilize temperature anomalies and radar return analysis to detect a HAIC or HAIC2 condition according to various embodiments.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the figures, systems and methods for reducing threats to aircraft engines are described, according to an exemplary embodiment. An airborne hazard warning system is generally configured to provide an indication of icing condition, icing condition signal or data to an engine control for an aircraft engine. The icing condition can be sensed aboard the aircraft or sensed remotely and provided to the aircraft according to certain embodiments. The icing conditions can include but are not limited to, high altitude associated threat (HAAT) and/or high altitude ice crystal (HAIC) or HAIC cloud ($HAIC^2$) conditions.

Figure 1:
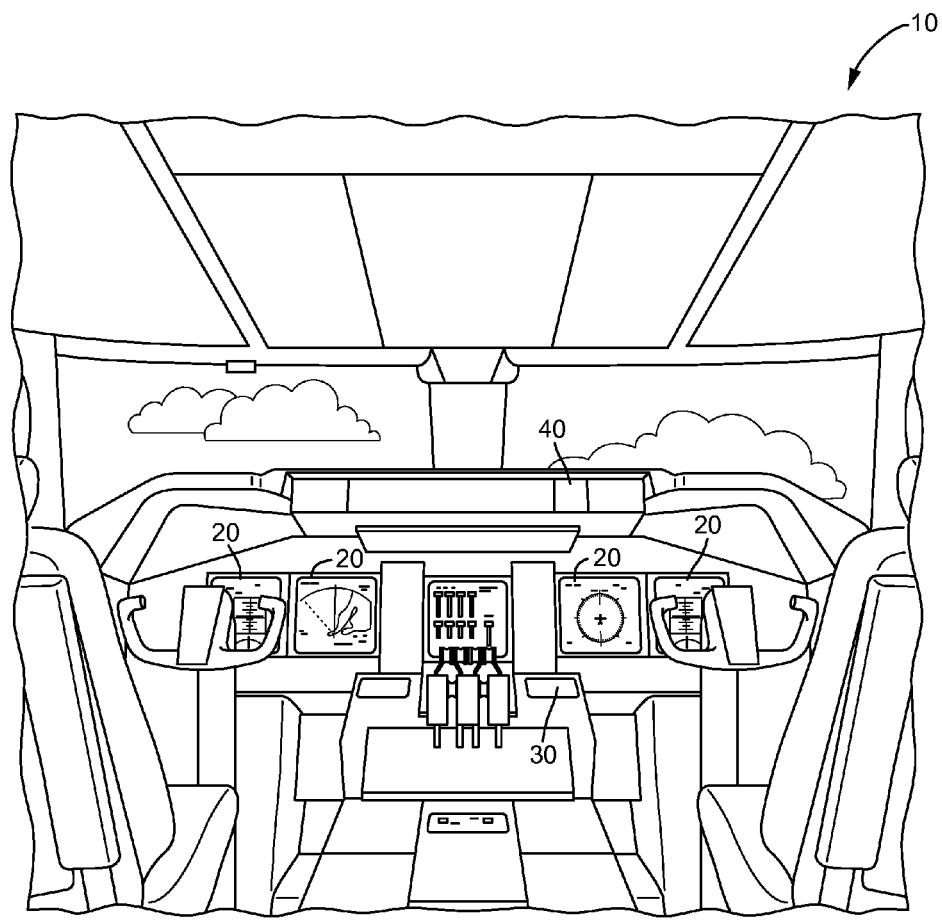
FIG. 1 is a perspective view schematic illustration of an aircraft control center, according to an exemplary embodiment.
Figure 2:
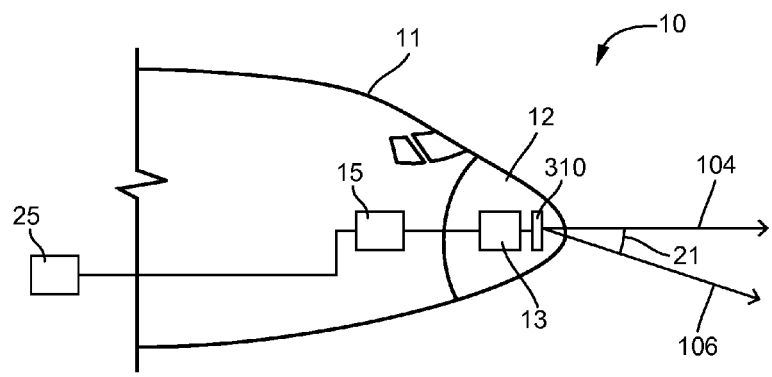
FIG. 2 is a side view schematic illustration of the nose of an aircraft including a hazard warning system, according to an exemplary embodiment.

Referring to FIGS. 1 and 2, a control center 10 is disposed at the front of an aircraft 11. A nose 12 of aircraft 11 includes a radar system 13 (e.g., a weather radar system or other radar system). Radar system 13 is generally located within nose 12 of aircraft 11 or within aircraft control center 10 of aircraft 11. Radar system 13 is optional and can be part of a hazard warning system 15 or in communication with the hazard warning system 15. In one embodiment, hazard warning system 15 receives data for detecting icing conditions about an environment from the radar system 13.

According to various exemplary embodiments, the radar system 13 may be located on the top of aircraft 11 or on the tail of aircraft 11 instead. Radar system 13 may include or may be coupled to an antenna system. A variety of different antennas or antenna systems may be used as part of the radar system 13 (e.g., a split aperture antenna, a monopulse antenna, a sequential lobbing antenna, etc.).

Radar system 13 generally works by sweeping a radar beam horizontally back and forth across the sky. Some embodiments of the radar system 13 may conduct a first horizontal sweep 104 directly in front of aircraft 11 and a second horizontal sweep 106 downward at some tilt angle 21 (e.g., 20 degrees down). Returns from different tilt angles 21 can be electronically merged to form a composite image for display on an electronic display 20 shown, for example, in FIG. 1. Returns can also be processed to, for example, distinguish between terrain and weather, to determine the height of terrain, or to determine the height of weather. Radar system 13 can be a WXR-2100 MultiScan™ radar system or similar system manufactured by Rockwell Collins and configured as described herein. According to other embodiments, radar system 13 may be an RDR-4000 system or similar system manufactured by Honeywell International, Inc. configured as described herein. Radar system 13 may be integrated with or operate with other avionic equipment and user interface elements in aircraft control center 10 (e.g., flashing lights 40, displays 20, display elements on a weather radar display, display elements on a terrain display, audio alerting devices 30, navigation systems, TAWs equipment, etc.).

Referring now to FIG. 1, aircraft control center 10 includes flight displays 20 which are generally used to increase visual range and to enhance decision-making abilities. In an exemplary embodiment, flight displays 20 may provide an output from radar system 13. For example, flight displays 20 may provide a top-down view, a horizontal view, vertical view/perspective or 3 dimensional view, or any other view of weather and/or terrain detected by a radar system on the aircraft such as the radar system 13. The views of weather may include monochrome or color graphical representations of the weather. Graphical representations of weather may include an indication of altitude of those objects or the altitude relative to the aircraft. Aircraft control center 10 may further include other user interface elements such as an audio alerting device 30 (e.g., speaker, electro-acoustic transducer, etc.), input devices (e.g., touch screens, joysticks, buttons, trackballs, etc.), and illuminating or flashing lamps or lights 40. Weather can be displayed as colored regions on the aircraft according to ARINC standards.

With reference to FIGS. 1 and 2, control center 10 can include hazard warning system 15 coupled to engine control 25 in one embodiment. Hazard warning system 15 and engine control 25 can be located at various locations on aircraft 11. In one embodiment, hazard warning system 15 is located in control center 10 and associated with or integral with radar system 13, and an engine control 25 is located with each engine on aircraft 11.

In one embodiment, hazard warning system 15 can be a discrete component or can be part of other aircraft systems. For example, hazard warning system 15 can be part of radar system 13 (e.g., an airborne weather radar system or part of a communications system. Hazard warning system 15 can be coupled to engine control 25 by any technique including by optical and electronic communications. Alternatively, hazard warning system 15 and engine control 25 can be communicatively coupled wirelessly. In one embodiment, an ARINC standard bus can be utilized to provide signals between hazard warning system 15 and engine control 25. Hazard warning system 15 can provide inferential or non-inferential icing condition detection in accordance with U.S. application Ser. Nos. 13/246,769, 14/206,651, 14/207,034 and 14/206,239 incorporated herein by reference in one embodiment. However, such detection techniques are not referenced in a limiting fashion, and the hazard warning system 15 can utilize any technique for determining icing conditions in environment 8 of aircraft 11.

In one embodiment, a HAIC, $HAIC^2$ and/or HAAT warning can be provided on any of displays 20 (FIG. 1) as part of a weather radar display. In one embodiment, the HAAT warning is displayed as a red speckled region, and the HAIC or $HAIC^2$ warning is displayed as a yellow speckled region. The red speckled region indicates a higher severity of threat for the HAAT warning as compared to the yellow speckled region for the HAIC or $HAIC^2$ warning.

Figure 3:
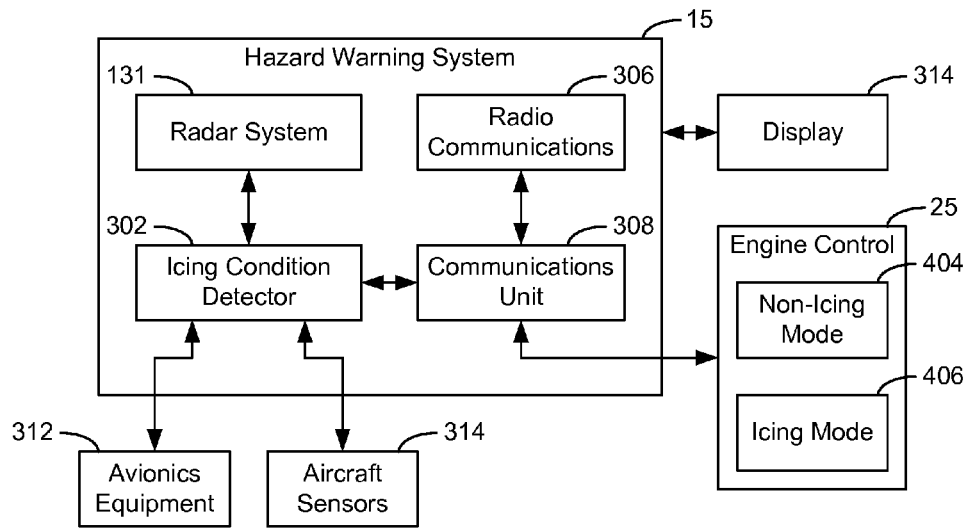
FIG. 3 is a block diagram of the hazard warning system illustrated in FIG. 2 and an engine control, according to an exemplary embodiment.

Referring to FIG. 3, hazard warning system 15 includes radar system 13, an icing condition detector 302, a radio communications unit 306, and a communications unit 308. In one embodiment, hazard warning system 15 uses data from one or more of radar system 13, the radio communications unit 306, avionics equipment 312 and aircraft sensors 314 to detect and assess an icing condition. Data indicative of the icing condition (e.g., an icing condition signal) is provided to engine control 25.

In one embodiment, radar system 13 includes a radar antenna 310 (FIG. 2) (e.g., weather radar antenna) connected (e.g., directly, indirectly) to an antenna controller and receiver/transmitter circuit. The antenna controller and receiver/transmitter circuit may include any number of mechanical or electrical circuitry components or modules for steering a radar beam. For example, the controller may be configured to mechanically tilt the radar antenna 310 in a first direction while mechanically rotating the radar antenna 310 in a second direction. Radar system 13 may be configured to conduct the actual signal generation that results in a radar beam being provided from radar antenna 310 and to conduct the reception of returns received at radar antenna 310. Radar return data is provided from weather radar system 13 to processing electronics associated with icing condition detector 302 for processing in one embodiment. For example, processing electronics can be configured to interpret the returns for display on a display 315 (e.g, any of displays 20). It should be noted that the processing electronics can be integrated into radar system 13 or located remotely from radar system 13, for example, in aircraft control center 10 or with hazard warning system 15.

Icing condition detector 302 can receive data from one or more of various sources to detect icing conditions. The icing conditions detector 302 can receive data form radar system 13 and determine whether an icing condition exists in one embodiment. Icing condition detector 302 can receive data from avionics equipment 312 and/or aircraft sensors 314 and determine whether an icing condition exists in one embodiment. Icing condition detector 302 can receive data from radio communications unit 306 from an outside source and determine whether an icing condition exists in one embodiment. Icing condition detector 302 is a processing platform operating software in one embodiment. Icing condition detector 302 can be embodied as a software module on a processing system which can be part of the radar system 13 or the hazard warning system 15 in one embodiment.

Icing condition detector 302 is communicatively coupled to aircraft sensors 314 via unit 308. Communications unit 308 can be any computing communication apparatus (e.g., a modem, router, bus controller, etc.). Sensors 314 generally include any number of sensors configured to provide data to icing condition detector 302 and other components on aircraft 11. For example, sensors 314 could include temperature sensors, humidity sensors, infrared sensors, altitude sensors, a gyroscope, a global positioning system (GPS), icing sensors, or any other aircraft-mounted sensors that may be used to provide data to the hazard warning system 15. It should be appreciated that sensors 314 (or any other component shown connected to icing condition detector 302) may be indirectly or directly connected to icing condition detector 302. Avionics equipment 312 can be or include a flight management system, a navigation system, a backup navigation system, or another aircraft system configured to provide data to icing condition detector 302.

Engine control 25 is coupled to icing condition detector 302 via communications unit 308 in one embodiment. Engine control 25 can be a FADEC or other electronic engine control in one embodiment. Engine control 25 is capable of operating in two or more modes. In a non-icing mode 404, engine control 25 operates the engine in a regular, efficiency or other mode that is not adjusted for icing conditions in one embodiment. In an icing mode 406, engine control 25 operates the engine in a mode for icing conditions in one embodiment. Icing mode 406 is configured so that operation of the engine in the icing environment is less susceptible to engine damage than in a regular mode (e.g, non-icing mode 404) in one embodiment.

Figure 4:
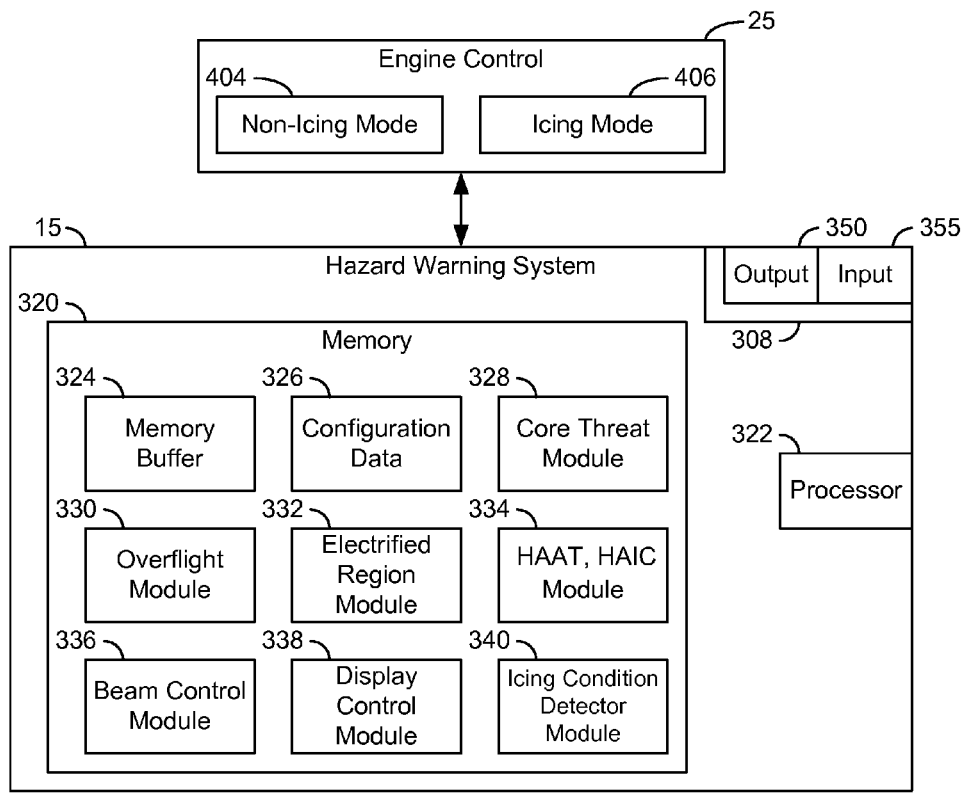
FIG. 4 is a more detailed block diagram of the hazard warning system and engine control illustrated in FIG. 3, according to another exemplary embodiment.

With reference to FIG. 4, hazard warning system 15 includes icing condition detector module 340 stored in a memory 320 and executed by a processor 322. In one embodiment, icing condition detector module 340 executed by processor 322 can perform the operations of icing condition detector 302 described herein. In one embodiment, icing condition detector 302 processes data associated with weather radar reflectivity levels and/or data from other sensors (e.g., temperature, altitude, icing sensor, etc.) to determine icing conditions in one embodiment. The icing condition can be sensed via an inferred or non-inferred process as explained below according to various exemplary embodiments.

In one embodiment, memory 320 includes a memory buffer 324 for receiving radar return data. The radar return data may be stored in memory buffer 324 until the memory buffer 324 is accessed for data. In one embodiment, memory 320 also stores a configuration data module 326, a core threat module 328, an overflight module 330, an electrified region module 332, a HAIC, $HAIC^2$ and HAAT module 334, a beam control module 336, and a display control module 338. Icing condition detector 302 can receive data from HAIC, $HAIC^2$, and HAAT module 334 for use in detection of icing conditions in one embodiment. Modules 328-338 can be executed by processor 322 to perform the operations described herein. HAIC, $HAIC^2$ and HAAT module 334 can advantageously detect and locate HAIC, HAIC2 and HAAT conditions and cause display 20 to provide a visual and/or audio warning of such conditions as discussed in the applications incorporated herein by reference.

Hazard warning system 15 can be connected to remote systems which may generally include any number of sensors located off the aircraft and configured to transmit data wirelessly to hazard warning system 15. For example, remote systems could include ground radars, satellites, other aircraft or any other remote system that may be used to provide data to hazard warning system 15. Hazard warning system 15 can use data from remote systems to determine icing conditions.

Processor 322 may be or include one or more microprocessors, digital signal processors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include icing condition detector module 340 and modules 328-338 which are computer code modules (e.g., executable code, object code, source code, script code, machine code, etc.) configured for execution by processor 322 in one embodiment. Hazard warning system 15 includes communications unit 308 having hardware interfaces (e.g., output 350) for communicating control signals (e.g., analog, digital) from hazard warning system 15 to engine control 25, radar system 13, radio communications unit 306, sensors 314 or equipment 312 or to display 315 which can be one of displays 20 (FIG. 1). Communications unit 308 of hazard warning system 15 also include an input 355 for receiving, for example, radar return data from system 300, feedback signals from system 15 or for receiving data or signals from other systems or devices (e.g., engine control 25 radio communications unit 306, sensors 314 or equipment 312).

The radar return data may be stored in memory buffer 324 until memory buffer 324 is accessed for data. For example, a core threat module 328, overflight module 330, electrified region module 332, HAIC, $HAIC^2$ and HAAT module 334, display control module 338, icing condition detector 302 (e.g., module 340 executed by processor 322). or another process that utilizes radar return data may access memory buffer 324. The radar return data stored in memory 320 may be stored according to a variety of schemes or formats. For example, the radar return data may be stored in an x,y or x,y,z format, a heading-up format, a north-up format, a latitude-longitude format, a radial format, or any other suitable format for storing spatial-relative information.

Memory 320 further includes configuration data 326. Configuration data 326 includes data relating to radar system 13. For example, configuration data 326 may include beam pattern data which may be data that a beam control module 336 can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like. Configuration data 326 may also include data, such as threshold values, model information, look up tables, and the like used by modules 328-338 and detector 302 to identify and assess threats to aircraft 11.

Memory 320 is further shown to include core threat module 328 which includes logic for using radar returns in memory buffer 324 to make one or more determinations or inferences relating to core threats to aircraft 11. For example, core threat module 328 may use temperature and radar return values at various altitudes to calculate a probability that lightning, hail, and/or strong vertical shearing exists within a weather cell. Core threat module 328 may be configured to compare the probability and/or severity of the core threat to a threshold value stored, for example, in core threat module 328 or configuration data 326. Core threat module 328 may further be configured to output a signal to display control module 338 indicative of the probability of the core threat, of the inferred threat level within the weather cell, or of the inferred threat level within the weather cell being greater than the measured threat due to radar returns from rainfall. The signal may further cause a change in a color on aviation display 20 associated to the threat level to aircraft 11.

Memory 320 is further shown to include overflight module 330 which includes logic for using radar returns in memory buffer 324 to make one or more determinations or inferences based on weather below aircraft 11. For example, overflight module 330 may be configured to determine the growth rate of a weather cell and/or the change in altitude of an echo top of a weather cell over time. Overflight module 330 may further be configured to calculate a probability that a weather cell will grow into the flight path of aircraft 11. Overflight module 330 may be configured to output a signal to display control module 338 indicating the threat of the growing weather cell in relation to the flight path of aircraft 11. For example, the signal may indicate predicted intersection of the flight path of aircraft 11 and the weather cell, rate of growth of the weather cell, or predicted growth of the weather cell to within a threshold distance of the flight path of aircraft 11. For example, the signal may cause an icon to be displayed on aviation display 20 in a location corresponding to the growing cell, wherein the size of the icon may represent the size, amount, or probability of threat to the aircraft. Overflight module 330 may be configured to inhibit display of weather far below, and thus not a threat to, aircraft 11.

Memory 320 is further shown to include electrified region module 332 which includes logic for using radar returns in memory buffer 324 to make one or more determinations or inferences regarding potentially electrified regions around the weather cell. For example, electrified region module 332 may be configured to use temperature and reflectivity to determine whether a region around a weather cell is likely to produce lightning. Electrified region module 332 may be configured to determine a probability of aircraft 11 producing a lightning strike if the aircraft flies through a particular region based on the reflectivity around a convective cell near the freezing layer. Electrified region module 332 may further be configured to cause a pattern to be displayed on aviation display 20. For example, electrified region module 332 may be configured to output a signal to display control module 338 indicating the existence, location, and/or severity of risk of the electrified region.

Memory 320 is further shown to include icing condition detector module 340 which includes logic for using radar returns (e.g., data) in memory buffer 324 to make one or more determinations or inferences regarding icing conditions. Icing conditions may be directly sensed by an icing sensor, by remote equipment providing data to icing condition detector 302, by system 300, or by combinations thereof. Icing conditions can be inferred from the detection of a blow off or anvil region of a weather cell. Icing conditions can be associated with high severity threat conditions such as hail, lightning, turbulence, etc. For example, icing condition detector 302 may be configured to use wind speed, wind direction, and size of a weather cell to predict the presence of an anvil region downwind of a weather cell that may contain lightning, hail, and/or turbulence.

Icing condition detector 302 may be configured to cause a pattern (e.g., a red speckled region) to be displayed on an aviation display 20 representing an icing condition. For example, icing condition detector 302 can be configured to output a signal or data to display control module 338 indicating the existence, location, and severity or risk of the anvil region. The icing condition detector 302 can detect a HAAT condition based upon the presence of convective cells reaching high altitudes and having anvil shapes. Such conditions can be sensed using the techniques described in U.S. application Ser. Nos. 13/919406 and 13/84893. Ice crystals may be present in a HAAT region. A HAAT condition generally is a more significant threat than a HAIC or $HAIC^2$ condition.

The icing condition detector 302 can also detect HAIC or $HAIC^2$ conditions and includes logic for using radar returns in memory buffer 324 to make one or more determinations or inferences regarding threats related to a HAIC or $HAIC^2$ condition. The icing conditions detector 302 can be combined with other modules (HAAT, HAIC or $HAIC^2$ module 334) in the hazard warning systems 15 or the radar system 13, can be a hard wired ASIC, or can be programmable logic circuit in one embodiment. The icing condition detector 302 and radar system 13 can be configured to use coherent and non-coherent integration processes to detect presence of the HAIC or $HAIC^2$ condition and its location in one embodiment. Alternatively, icing condition detector 302 and radar system 13 can utilize a dual frequency or dual polarization process discussed in related U.S. patent application Ser. No. 14/206,651 incorporated herein by reference in one embodiment. In one embodiment, icing condition detector 302 receives data associated with weather returns at high altitude and processes the data to determine existence of a HAIC or $HAIC^2$ condition. The data can be processed by comparing the data to known ice crystal return characteristics to determine a match and therefore a HAIC or $HAIC^2$ condition. In one embodiment, icing condition detector 302 senses only one of a HAIC or $HAIC^2$ condition. Although HAAT, HAIC and $HAIC^2$ conditions are discussed with respect to icing condition detector 302, the detection of such conditions and the techniques for such detections are not discussed in a limiting fashion. The icing condition detector 302 can detect other types of icing conditions or hazards with other techniques without departing from the scope of the invention.

Memory 320 is further shown to include beam control module 336. Beam control module 336 may be an algorithm for commanding radar antenna 310 to sweep a radar beam. Beam control module 336 may be used, for example, to send one or more analog or digital control signals for radar antenna 310. The control signals may be, for example, an instruction to move radar antenna 310 mechanically, an instruction to conduct an electronic beam sweep in a certain way, an instruction to move the radar beam to the left by five degrees, etc. Beam control module 336 controls timing of the beam sweeps or movements relative to aircraft speed, flight path information, transmission or reception characteristics from radar system 13 or otherwise. Beam control module 336 may receive data from configuration data 326 for configuring the movement of the radar beam.

Memory 320 is further shown to include display control module 338 which includes logic for displaying weather information on display 315. For example, display control module 338 may be configured to display radar return information received from memory buffer 324 and to determine a gain level or other display setting for display of an inferred threat to aircraft 11 on a radar display 315. Display control module 338 may be configured to receive signals relating to threats to aircraft 11 from core threat module 328, overflight module 330, electrified region module 332, and icing condition detector 302. Display control module 338 may further be configured to cause, in response to one or more signals received from threat modules 328-334 and icing condition detector 302 and threshold values from configuration data 326, a change in color of a portion of an image on aviation display 20, a pattern (e.g., a speckled region) to be overlaid on an image on aviation display 20, and an icon to be shown on aviation display 20. Display control module 338 may be configured to cause a change in size, location, shape, or color of the colored regions, patterns, symbols, and/or icons in response to updated signals received from modules 328-336 and icing condition detector 302. Further, display control module 338 can provide a pattern or symbol to indicate an inferred HAIC or HAIC2 warning and to indicate a non-inferred HAIC or HAIC$^2$ warning.

Radar system 13 may be configured to use none, some, or all of the threat modules 328-334 described above. For example, weather radar system 13 may have an automatic mode, in which weather radar antenna 310 is automatically controlled (e.g., direction, gain, etc.) and core threat module 328, overflight module 330, electrified region module 332, and icing condition detector 302 are all processing information looking for inferred threats. Radar system 13 can have a manual mode, in which one or more of core threat module 328, overflight module 330, electrified region module 332, and icing condition detector 302 are disabled, for example, for diagnostic purposes.

In one embodiment, with reference to FIG. 4, icing condition detector 302 can use an inferential process to detect an icing condition. In one embodiment, the icing condition can be inferred by sensing temperature anomalies and reflectivity characteristics associated with core threats. A temperature anomaly can be a condition where temperature detected by the weather radar system 13, a local sensors (e.g., a temperature sensor on aircraft 11 (e.g., Full Authority Digital Engine Control (FADEC) saturated temperature input)), or a remote sensor is different than a predicted (e.g. expected) or baseline atmospheric temperature. The temperature can be a saturated temperature value in one embodiment. The temperature value can be adjusted for heating caused by the movement of aircraft 11 through the atmosphere in one embodiment. The predictive or baseline temperature can be from satellite trip information. A large discrepancy (e.g., 15 degrees centigrade (C) or more) between the actual temperature and the predicted temperature at the altitude of the aircraft 11 can indicate a potential icing condition according to one embodiment. In one embodiment, a local temperature reading more than 15 degrees warmer than the expected temperature indicates an anomaly. A low pass filter or averaging technique can be used to prevent a spurious reading from improperly causing a temperature anomaly to be detected.

Icing condition detector 302 may optionally receive data from another on-board HAIC or icing detection source (e.g., infrared, LIDAR, etc.), an icing sensor, or a remote icing detection source (e.g., ground-based radar, satellites, other aircraft, etc.) in one embodiment. Icing condition detector 302 can identify convective cells or cores using cell height, cell growth, and other analysis techniques when detecting icing conditions according to one embodiment. Generally, cores in front of or along the flight path of aircraft 11 are identified for further analysis. Cores can be identified using core threat module 328. Identification of cores is discussed in U.S. application Ser. No. 13/841,893 incorporated herein by reference. Cores can be identified by analyzing spectral characteristics in areas of higher reflectivity in one embodiment. In one embodiment, the information can be used to identify cores or increase confidence in the cores identified using radar parameters.

Using data from weather radar system 13, icing condition detector 302 can identify large areas (e.g. more than a square nm, several square nms, ten square nm, etc.) of weaker reflectivity in the vicinity of a convective core. Areas for scanning are chosen based upon a presence of core cells. Icing assessment or inference may also be performed by other sensors on board the aircraft (infrared, LIDAR, etc.) or off the aircraft by ground radars or satellites. The icing detection assessment or inference information may be optionally input to radar system 13 for identification of the icing condition in one embodiment. When the icing detection assessment or inference information is input into radar system 13, the scanning region or location of the radar beams may be directed to scan that region and a higher confidence of the icing condition can be determined. The Doppler processing of the radar returns or off-aircraft wind information can provide additional information for detection of icing conditions.

In one embodiment, vertical scans and/or auxiliary horizontal scans can be commanded via module 336 to look for the presence of high water content (high reflectivity) beneath the areas that were depicted as weaker reflectivity (green or black). If such a scenario is identified using the vertical and horizontal beams, the area is tagged or identified as a potential area for an icing condition by icing condition detector 302 in one embodiment. The area can be identified on display 314 with an icing warning. High water content can be identified by using a vertical integrated liquid (VIL) measurement or a reflectivity measurement in one embodiment. VIL measurement techniques are discussed in U.S. patent application Ser. No. 14/086,844 filed Nov. 21, 2013 and incorporated herein by reference in its entirety.

In one embodiment, icing condition detector 302 includes an inferential detection path which uses a temperature anomaly detector and a return data analysis module. The temperature anomaly detector compares the sensed outside temperature at or near the altitude of aircraft 11 with the expected temperature at the altitude in accordance with the atmosphere conditions. The expected temperatures can be provided by or derived from data received real time or received during flight preparation. Temperature readings in NEXRAD data can be utilized for expected temperature values.

Once a temperature anomaly is detected, icing condition detector 302 can provide vertical and horizontal radar returns to an area in the vicinity of a weather cell core as detected by core module 328 according to one embodiment. Various algorithms and techniques can analyze radar returns to determine an icing condition. In one embodiment, if icing condition detector 302 determines that a yellow or higher region is directly in front of aircraft 11 when temperature anomaly is detected, icing condition detector 302 identifies an icing condition in front of aircraft 11. Beam control module 336 under control of icing condition detector 302 can have radar antenna 310 provide beams to the areas in the vicinity of cores found by core threat module 328. When reflectivities from these areas indicate that higher reflectivity is located at a location below the freezing level, icing condition detector 302 provides an indicator of the presence of an icing condition in one embodiment. For example, if precipitation rates associated with a red or yellow region are detected below the freezing level, an icing condition is present.

Icing condition detector 302 can directly detect an icing condition using a combination of coherent and non-coherent integration. Various algorithms or techniques can be utilized to discriminate an icing condition from the radar return data. The icing condition detector 302 can compare the characteristics of the radar data to known ice crystal reflectivity characteristics to determine an icing condition. For example, an icing condition can be determined when reflectivity levels are above a level zero or nominal level and less than a level associated with liquid precipitation. According to another example, icing condition detector 302 can utilize temperature and reflectivity to determine the presence of an icing condition. According to another embodiment, an icing condition can be determined if the appropriate reflectivity level is provided across a significant area (e.g., many range bins). According to yet another embodiment, temperature, combined with reflectivity level or area and reflectivity level can be utilized to determine the presence of an icing condition. In another embodiment, the radar returns are processed to determine whether the radar returns indicate spherical targets which are more likely water or non-spherical targets which are more likely ice crystals.

In one embodiment, if the temperature is below temperature threshold (e.g. −20 degrees Celsius), the reflectivity level is consistent with ice crystal levels and the altitude is above a threshold (e.g. 10,000 feet), an icing condition is detected. In one embodiment, modern fuzzy logic techniques can be utilized to detect and discriminate icing conditions. The reflectivity characteristics of known HAIC and HAIC2 or other icing conditions can be stored and used for comparisons. In one embodiment, HAIC and HAIC2 or other icing conditions can be stored with respect to particular locations or locations types (e.g., continental, maritime, etc.) and/or seasons and the comparisons can be made with consideration of location and/ or season.

Icing condition detector 302 can provide an indication of the detected icing condition to engine control 25. The indication can be data including an indication of icing condition severity (e.g., level of icing condition) and a confidence level associated with the detection. Engine control 25 can use the data to select or change to an appropriate mode such as modes 404 and 406.

Figure 5:
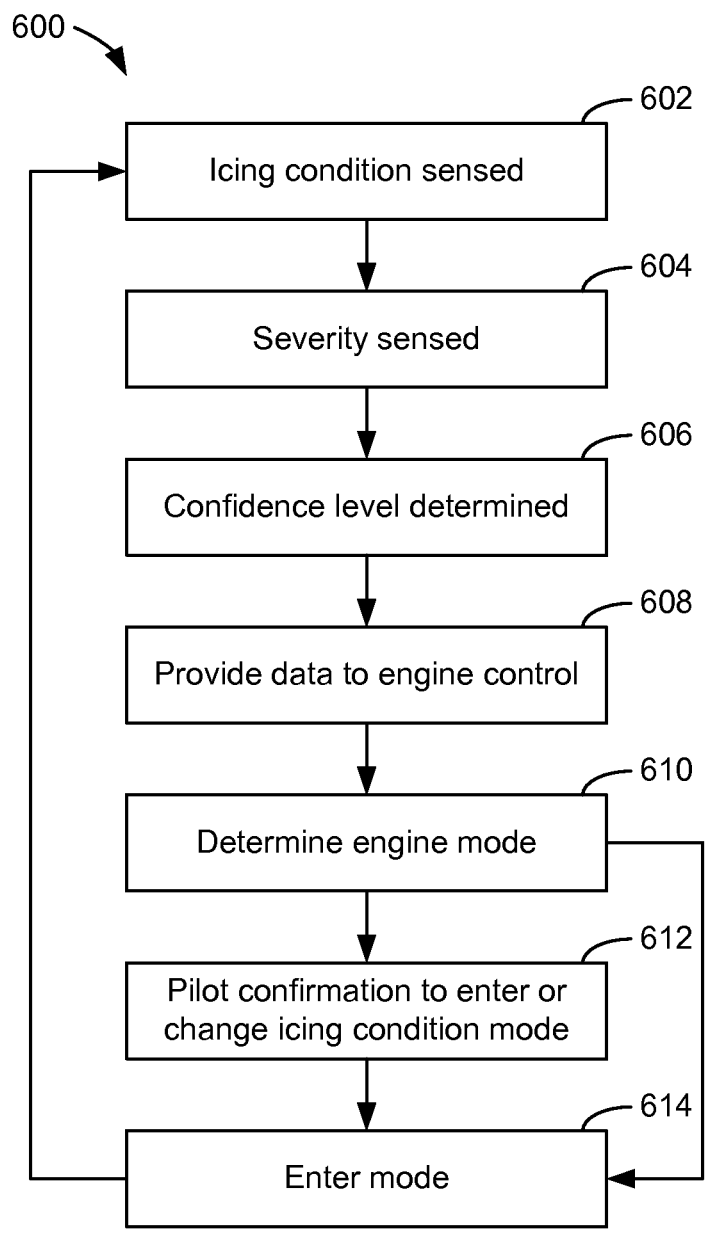
FIG. 5 is a general flow diagram showing a process performed by the hazard warning system and engine control illustrated in FIGS. 3 and 4, according to an exemplary embodiment.

With reference to FIG. 5, hazard warning system 15 and engine control 25 can operate according to flow 600 to control operation of one or more engines according to one embodiment. At an operation 602, icing condition detector 302 can determine a presence of an icing condition or an absence of an icing condition. If a presence is detected, icing condition detector 302 can detect whether the operational environment of aircraft 11 is in the location of the icing detection or is within a distance of the operational environment of aircraft 11. If so, icing condition detector 302 can sense the severity of the icing condition at an operation 604 and assign a confidence level to the detection at an operation 606.

In one embodiment, icing condition detector 302 can receive a map of icing conditions or receive data for such a map via unit 306. The map can be garnered from observations from other aircraft, satellite images, terrestrial sources, etc. Icing condition detector 302 can use the location of aircraft 11 as correlated to the map to determine whether an icing condition is in the vicinity of aircraft 11.

Any of the techniques discussed above can be utilized to sense and assess an icing condition. In one embodiment, icing condition detector 302 detects an icing condition by analyzing outside temperature for a total air temperature (TAT) anomaly. A TAT anomaly can be indicative of icing conditions. In one embodiment, the TAT anomaly is a sudden increase in air temperature (e.g., a 15 to 20 C degree increase from the normal, approximately −55 C degree band of temperature at 38,000 feet) in one embodiment. Radar system 300 can use sensors 314 (e.g., altimeter, and thermal sensors) to determine the presence of the TAT anomaly. In one embodiment, an icing condition is identified when there is a TAT anomaly and an area of high radar reflectivity at lower altitudes or a change in radar reflectivity (e.g., a change in reflectivity from green to yellow at altitude).

In another embodiment, icing condition detector 302 can determine an icing condition by using an icing sensor (of sensors 314) to sense an icing condition. The sensor can use an electrical field to sense the presence of ice on a surface of aircraft in one embodiment. The sensor can be a surface mount electrical sensor, an optical sensor, capacitive senor, etc.

At an operation 608, icing condition detector 302 provides data indicative of the icing condition, its severity, and the confidence level to engine control 25. In one embodiment, data for the severity level and confidence level is optional. If a presence is not detected or is not in the vicinity of aircraft 11, icing condition detector 302 can provide data to engine control 25 that an icing condition is not present at operation 608.

Severity level can be related the amount a reading is above a threshold for detecting the icing condition (e.g., the more the reading is above the threshold, the higher the level of severity). In one embodiment, the confidence level can be related a distance to aircraft 11 (e.g., the closer the icing condition, the greater the confidence level). In one embodiment, the confidence level can be related to severity level. In another embodiment, the type of sensor or technique that detects the icing condition can be a factor in the confidence level. Inferred detections can have a lower confidence level than actual detections. When several inferred techniques detect an icing condition in a similar location, the confidence level can be increased.

In one embodiment, the icing sensor can provide an indication of the thickness of ice build-up on aircraft 11 which can be correlated with severity of the icing condition. Further, sensing actual ice build-up with the icing sensor indicates a high level of confidence in the detection of the icing condition.

In one embodiment, the density of ice crystals in the environment detected by using data from radar system 13 provides an indication of severity and confidence. A density of 0.1 grams per meter cubed or greater increases the severity and confidence in the icing condition detection by icing condition detector 302. The closeness of the area of high density to aircraft 11 also can increase the confidence. In one embodiment, a density of 0.2 grams per meter cubed within 10 miles of aircraft 11 could result in a confidence of 95 percent. In another embodiment, the confidence can be reduced if convective weather is not present in the area of aircraft 11.

At operation 610, engine control 25 responds the indication of the icing condition and determines an appropriate operational mode for the engine or engines of aircraft. The mode can be a non-icing mode 404 (e.g., a high efficiency mode) if an icing condition is not a threat or an icing mode 406 if an icing condition is a threat. Engine control 25 can include more than one non-icing mode and more than one icing mode. The mode can be selected according to various factors including throttle position, phase of flight, air density, engine temperature, engine pressure, severity and confidence, etc. In one embodiment, additional heat is used in icing mode 406 or an adjustment to a position of the turbine blades (e.g., blade angle) is used in icing mode 406. In one embodiment, icing mode 406 operates the engine at a higher temperature to reduce icing. Higher temperature operation can be achieved by operating the engine in a less efficient mode in one embodiment. The temperature for the operation can be chosen based upon the severity level in one embodiment. The mode can be chosen using severity and confidence data in one embodiment.

At an operation 612, engine control 25 can provide a message to notify the pilot of a mode change in response to the determination in operation 610. In one embodiment, the selected mode is not entered in operation 614 without confirmation by the pilot. In one embodiment, operation 612 is optional. When the mode is entered, flow 600 returns to operation 602.

In one embodiment, the engine of aircraft 11 includes icing detectors. The icing detectors can be embodied as software modules that receive temperature, flow and other inputs from sensors associated with the engine to determine a presence of an icing condition. The software module (e.g., in the FADEC) can receive an input from radar system 13 as well as an icing sensor on the engine or aircraft 11. Engine control 25 can respond to its icing detector to enter a higher or lower efficiency mode in response to the presence of the icing condition in one embodiment.

Figure 6:
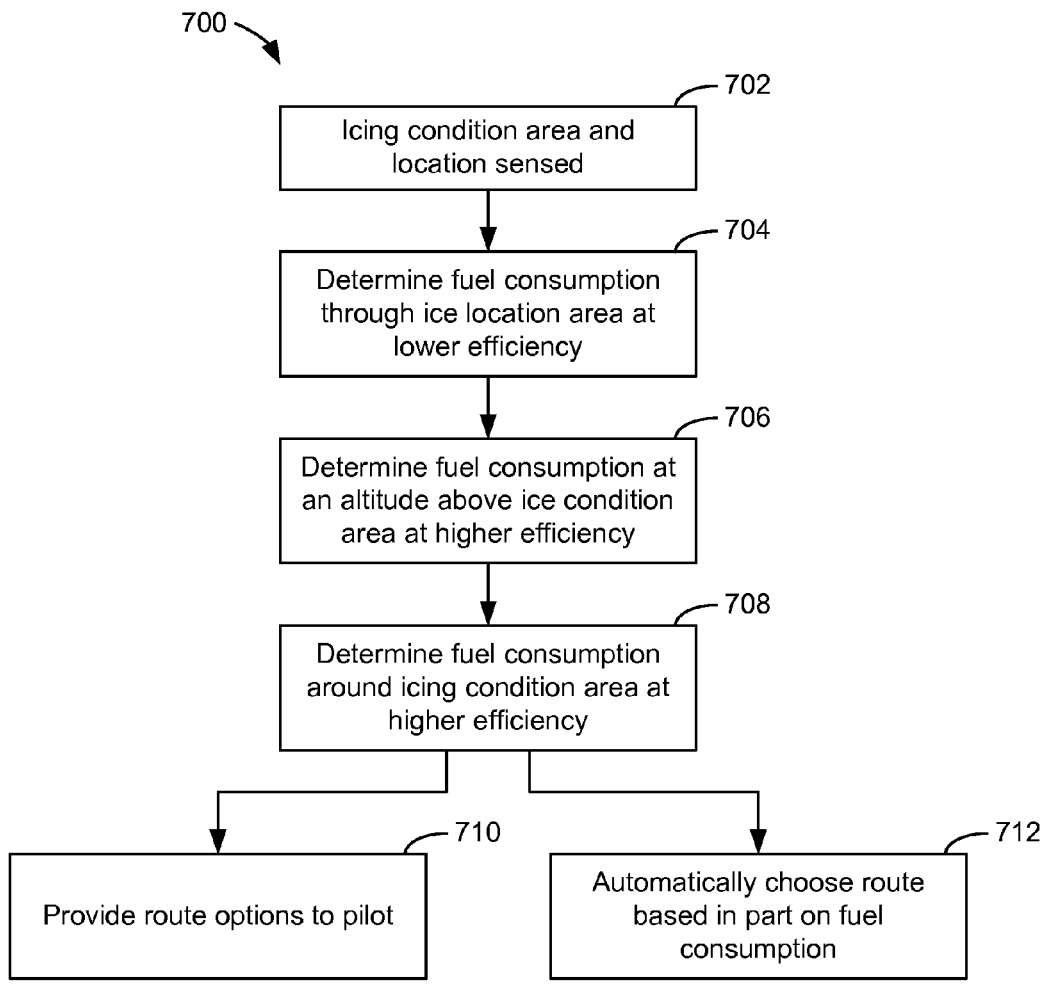
FIG. 6 is a general flow diagram showing a field consumption optimization process performed by the hazard warning system and engine control illustrated in FIGS. 3 and 4, according to an exemplary embodiment.

With reference to FIG. 6, hazard warning system 15, a flight management computer, and/or engine control 25 can operate according to flow 700 to control operation of one or more engines and select flight routes to reduce excess fuel consumption according to one embodiment. At an operation 702, icing condition detector 302 can determine a presence of an icing condition and a location, altitude, and area of the icing condition. Alternatively, a detector associated with the engine (e.g., engine control 25) can detect an icing condition and a location, altitude, and area of the icing condition.

If a presence is detected, icing condition detector 302, engine control 25 or the flight computer can detect whether the flight path of aircraft 11 intersects or is within a distance (e.g., several nautical miles or other distance) of the operational environment of aircraft 11. The distance can be a factor of confidence in the detection and severity of the icing condition in the area in one embodiment. Any of the techniques discussed above including but not limited to flow 600 can be utilized to sense, assess, locate and determine the area of an icing condition.

If the flight path of aircraft 11 intersects or is within a distance of the operational environment of aircraft 11, icing condition detector 302, engine control 25 or the flight management computer can determine the fuel consumption associated with operating the engine at a lower efficiency (e.g, an icing mode or low bypass mode) through the area of the icing condition at an operation 704. Icing condition detector 302, engine control 25 or the flight management computer can also determine the fuel consumption associated with operating the engine at a higher efficiency (e.g, a non-icing mode or high bypass mode) and flying the aircraft at an altitude above the area of the icing condition at an operation 706. Icing condition detector 302, engine control 25 or the flight management computer can also determine the fuel consumption associated with operating the engine at a higher efficiency (e.g, a non-icing mode or high bypass mode) and flying the aircraft around the area of the icing condition at an operation 708. Operation 708 can be used to provide multiple fly around options and associated fuel consumption. Operation 708 can also be used to provide routes and fuel consumption for the routes that partially fly around the icing condition at higher efficiency and partially fly through the icing condition at reduced efficiency, that partially fly above the icing condition at higher efficiency and partially fly through the icing condition at reduced efficiency, that partially fly above the icing condition and partially fly around the icing condition ate higher efficiency, or that partially fly around the icing condition and partially fly above the icing condition at higher efficiency and partially fly through the icing condition at reduced efficiency.

At an operation 710, icing condition detector 302, engine control 25, or the flight management computer can provide a message to notify the pilot of the fuel consumption associated with the options identified in operations 704, 706, and 708. The options can also include a destination time for each option. The pilot can select the best option and manually or automatically change the flight plan accordingly. Alternatively, icing condition detector 302, engine control 25 or the flight management computer can automatically select an option associated with operations 704, 706, and 708. The options can be selected based upon fuel consumption, destination time, confidence in detection, and severity of the icing condition.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

According to various exemplary embodiments, hazard detection system 15 may be embodied as hardware and/or software. In exemplary embodiments where the processes are embodied as software, the processes may be executed as computer code on any processing or hardware architecture (e.g., a computing platform that can receive reflectivity data from a weather radar system) or in any weather radar system such as the WXR-2100 system available from Rockwell Collins, Inc. or an RDR-400 system available from Honeywell, Inc. The processes can be performed separately, simultaneously, sequentially or independently with respect to each other.

While the detailed drawings, specific examples, detailed algorithms and particular configurations given describe preferred and exemplary embodiments, they serve the purpose of illustration only. The inventions disclosed are not limited to the specific forms and equations shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Further, the term HAIC condition as used in the claims and related applications can refer to a HAIC condition and/or HAIC$^2$ condition, unless explicitly limited to a HAIC$^2$ condition. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. An aircraft comprising:
   an engine;
   an engine controller; and
   an icing condition detector, the icing condition detector being configured to be in communication with the engine controller, determine a presence of an icing condition and provide an indication of the presence of the icing condition to the engine controller, wherein the engine controller is configured to operate the engine in a lower efficiency mode in response to the indication, wherein the engine is less susceptible to damage when operating in the lower efficiency mode than when operating in a higher efficiency mode in the presence of the icing condition.

2. The aircraft of claim 1, wherein the indication of the icing condition comprises an intensity factor, confidence factor, or both the intensity factor and the confidence factor, and wherein the engine controller is configured to operate the engine in the lower efficiency mode in response to the confidence factor and the intensity factor, wherein the confidence factor is based at least in part on a distance of the presence of the icing condition to the aircraft.

3. The aircraft of claim 1, wherein a location of an icing area is determined at a distance from the aircraft, and the presence of the icing condition is determined when the location of the icing area is in a flight path of the aircraft.

4. The aircraft of claim 1, wherein the engine controller is a full authority digital engine control (FADEC).

5. The aircraft of claim 1, wherein the icing condition detector comprises a weather radar system and is configured to determine the icing condition using weather radar signals.

6. The aircraft of claim 1, wherein the icing condition detector determines the icing condition using data received from a remote source.

7. The aircraft of claim 1, wherein the engine comprises turbine blades, wherein the engine controller adjusts an angle of the turbine blades in response to the indication.

8. The aircraft of claim 7, wherein the lower efficiency mode utilizes a blade adjustment.

9. The aircraft of claim 1, wherein the indication is provided if the presence of the icing condition is detected at a distance from the aircraft and at an altitude at or above an altitude of the aircraft or a flight plan of the aircraft at the location.

10. The aircraft of claim 1, wherein the icing condition is associated with a HAAT condition or a HAIC condition sensed using radar signals from an onboard weather radar system.

11. A method of controlling an engine using an electronic processor, the method comprising:
    detecting using a weather radar system an area associated with an icing condition;
    providing data associated with the icing condition to the electronic engine controller; and
    operating the engine using the electronic engine controller in a lower efficiency mode in response to the data indicating a presence of an icing condition.

12. The method of claim 11, further comprising:
    determining first fuel consumption associated with a first route through the area associated with the icing condition in the lower efficiency mode, and a second fuel consumption associated with a second route around or above the area of the icing condition at a higher efficiency mode.

13. The method of claim 12, further comprising:
    selecting the first route or the second route based at least in part on the first fuel consumption and the second fuel consumption.

14. The method of claim 11, further comprising operating the engine in a higher efficiency mode when the data indicates the icing condition is not present, wherein the lower efficiency mode uses a blade angle different from a blade angle in a high efficiency mode.

15. The method of claim 11, wherein the data includes an indication of intensity and confidence, wherein the intensity is based in part on a density of ice crystals and the confidence is based in part on a distance of the area to the aircraft.

16. The method of claim 15, wherein the confidence is lowered when the weather radar system does not detect convective weather near the aircraft.

17. An aircraft weather system comprising:
    a processor configured to determine a presence of an icing condition in response to radar return data, the processor being configured to provide an icing threat signal if the icing condition is a threat to the aircraft, the icing threat signal being provided if a location of the icing condition is near the aircraft; and
    a communication circuit configured to provide the icing threat signal associated with the icing condition to an engine control.

18. The aircraft weather system of claim 17 further comprising a display for providing weather images, the display providing the warning of the icing condition.

19. The aircraft weather system of claim 17, further comprising a user interface for providing a signal to an engine to enter a mode in response to the indication.

20. The aircraft weather system of claim 19, wherein the icing threat signal is provided in response to a confidence level and a severity level, the severity level being based in part on an ice crystal density determined form the radar data.

* * * * *